US011385509B2

(12) United States Patent
Wu (10) Patent No.: US 11,385,509 B2
(45) Date of Patent: Jul. 12, 2022

(54) DISPLAY PANEL AND DISPLAY APPARATUS (71) Applicants: HKC CORPORATION LIMITED, Shenzhen (CN); CHONGQING HKC OPTOELECTRONICS TECHNOLOGY CO., LTD., Chongqing (CN)

(72) Inventor: Chuan Wu, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 17/042,901

(22) PCT Filed: Dec. 12, 2018

(86) PCT No.: PCT/CN2018/120592
§ 371 (c)(1),
(2) Date: Sep. 28, 2020

(87) PCT Pub. No.: WO2020/062596
PCT Pub. Date: Apr. 2, 2020

(65) Prior Publication Data
US 2021/0055596 A1 Feb. 25, 2021

(30) Foreign Application Priority Data
Sep. 30, 2018 (CN) .......................... 201811158778.X (51) Int. Cl.
*G09G 3/36* (2006.01)
*G02F 1/1345* (2006.01)
*G02F 1/1362* (2006.01)

(52) U.S. Cl.
CPC .... *G02F 1/13452* (2013.01); *G02F 1/136286* (2013.01); *G09G 3/3648* (2013.01); *G02F 2201/42* (2013.01)

(58) Field of Classification Search
CPC ........... G02F 1/13452; G02F 1/133345; G02F 1/13458; G02F 1/13398; G02F 1/13629;
(Continued)

(56) References Cited

U.S. PATENT DOCUMENTS 9,947,694 B2 * 4/2018 Lee ...................... H01L 27/1244
10,127,855 B2 * 11/2018 Zhang ................... G09G 3/2092
(Continued)

FOREIGN PATENT DOCUMENTS

CN 101963714 A 2/2011
CN 103399434 A 11/2013
(Continued)

OTHER PUBLICATIONS

Jinjnng Feng, the ISA written comments, dated May 2019, CN.
Jinjing Feng, the International Search Report, dated May 2019, CN.

*Primary Examiner* — Duc Q Dinh (57) ABSTRACT

This application discloses a display panel and a display apparatus. A non-display area in the display panel includes a plurality of fan-out areas, a drive circuit in the display panel includes a plurality of sub-drive circuits, each fan-out area is an area formed by all first metal lines connected with each sub-drive circuit, and the fan-out areas are connected with a display area and the drive circuit; each fan-out area includes a plurality of second metal lines, and each of the second metal lines is located between two adjacent first metal lines; and the surface of each fan-out area is flat.

17 Claims, 7 Drawing Sheets (58) Field of Classification Search
CPC .... G02F 1/1309; G02F 1/1337; G02F 1/1339; G02F 1/1345; G02F 1/136286; G02F 2201/42; G09G 3/3648; G09G 2320/0247; G09G 2310/0281; G09G 2370/08; G09G 3/2092; G09G 2310/0264; G09G 2300/0426; G09G 2310/0218; G09G 2310/0221; G09G 3/20; G09G 3/364
See application file for complete search history.

(56) References Cited

U.S. PATENT DOCUMENTS

| | | | |
|---|---|---|---|
| 2007/0052895 A1* | 3/2007 | Chen | H05K 1/0213 349/139 |
| 2010/0025630 A1 | 2/2010 | Swager et al. | |
| 2010/0156769 A1* | 6/2010 | Chang | G09G 3/3648 345/87 |
| 2017/0075158 A1* | 3/2017 | Wang | G02F 1/13452 |
| 2020/0058725 A1* | 2/2020 | Ka | H01L 51/5253 |

FOREIGN PATENT DOCUMENTS

| | | |
|---|---|---|
| CN | 104238213 A | 12/2014 |
| CN | 104269415 A | 1/2015 |
| CN | 104407477 A | 3/2015 |
| CN | 106444193 A | 2/2017 |
| CN | 106526995 A | 3/2017 |
| CN | 207557624 A | 6/2018 |

\* cited by examiner

DISPLAY PANEL AND DISPLAY APPARATUS

CROSS REFERENCE OF RELATED APPLICATION

This application claims the priority to the Chinese Patent Application No. CN201811158778.X, filed with National Intellectual Property Administration. PRC on Sep. 30, 2018 and entitled "DISPLAY PANEL AND DISPLAY APPARATUS", which is incorporated herein by reference in its entirety.

TECHNICAL FIELD

This application relates to the field of display technologies, and in particular, to a display panel and a display apparatus.

BACKGROUND

Statement herein merely provides background information related to this application and does not necessarily constitute the existing technology.

Along with the development and progress of science and technology, liquid crystal displays have numerous advantages, such as a thin body, power saving, no radiation, etc., and are widely used. Most of liquid crystal displays on the market are backlight-type liquid crystal displays, including liquid crystal panels and backlight modules. Liquid crystal panels include color filter substrate (CF substrate, which is also referred to as color filter substrate) and thin film transistor substrate (TFT Substrate), transparent electrodes are provided on opposite inner sides of the substrates, and a layer of liquid crystal (LC) molecules is clamped between two substrates.

Before TFT-LCD is filled with liquid crystal, the thin film transistor substrate and the color filter substrate with patterns are firstly coated with an alignment layer (PI) to produce an anchoring force for the liquid crystal, so that the liquid crystal has a constant tilt angle. Then the alignment layer (PI) is liquid when applied on the substrate, and an alignment film can be formed only by drying the alignment liquid. As being liquid, the alignment liquid will have certain fluidity when dripping onto the substrate. On the side of the thin film transistor substrate, the flow of the alignment liquid has a great relationship with the "terrain". After being applied, the alignment liquid is easy to flow to the frame glue along "grooves" formed by tracks of these fan-out areas and is overlapped with the frame glue to affect the curing of the frame glue, thus causing quality problems.

SUMMARY

An objective of this application is to provide a display panel and a display apparatus for solving the problem of the existence of grooves on surfaces of fan-out areas.

In order to achieve the above objective, this application provides a display panel. The display panel includes: a display area including data lines and scanning lines, the data lines and scanning lines are vertically distributed; a non-display area arranged around the display area and including a plurality of first metal lines, the first metal lines are connected with the data lines or the scanning lines, and the plurality of first metal lines are arranged on a same layer; and a drive circuit connected with the data lines or the scanning lines through the first metal lines. The non-display area includes a fan-out area. The drive circuit includes a plurality of sub-drive circuits. The fan-out area is an area formed by all the first metal lines connected with each sub-drive circuit, and the fan-out area is connected with the display area and the drive circuit. The fan-out area includes a plurality of second metal lines, each of the second metal lines is located between two adjacent first metal lines; and the surface of the fan-out area is flat.

This application further discloses a display panel. The display panel is divided into a display area and a non-display area, and the display panel includes a drive circuit including a plurality of sub-drive circuits. The non-display area includes a plurality of first metal lines, one end of each first metal line is connected with data lines or scanning lines in the display area, and the other end is connected with the sub-drive circuits. The plurality of the first metal lines are arranged on the same layer; the non-display area includes a plurality of fan-out areas, the fan-out areas are areas formed by all the first metal lines connected with each sub-drive circuit. Each fan-out area includes a plurality of second metal lines, a conductive layer, first transfer via holes, second transfer via holes, a first insulating layer and a second insulating layer. The first insulating layer is arranged on the surfaces of the first metal lines. The second metal lines are arranged on the first insulating layer, each of the second metal lines is located between two adjacent first metal lines, two ends of each of the second metal lines are arranged right above the adjacent first metal lines, and the surface of each second metal line is flush with the surface of the first insulating layer. The second insulating layer is arranged on the surfaces of the second metal lines. The first transfer via holes expose the first metal lines, the second transfer via holes expose the second metal lines, and the conductive layer connects the first metal lines exposed by the first transfer via hole and the second metal lines exposed by the second transfer via hole.

This application further discloses a display apparatus. The display apparatus includes the display panel.

Compared with the display panel with grooved fan-out areas, this application uses the second metal lines to fill up clearances among tracks of the fan-out area, so that the whole fan-out area forms a relatively flat terrain rather than a terrain with "channels", and the alignment liquid can be prevented from flowing along the channels, and meanwhile, the first metal lines and the second metal lines are connected in parallel, thereby reducing the impedance of the tracks of the fan-out areas.

BRIEF DESCRIPTION OF DRAWINGS

The drawings included are used for providing understanding of embodiments of the present application, constitute part of the specification, and are used for illustrating implementation manners of the present application, and interpreting principles of the present application together with text description. Apparently, the accompanying drawings in the following descriptions are merely some embodiments of this application, and a person of ordinary skill in the art can also obtain other accompanying drawings according to these accompanying drawings without involving any creative effort. In the accompanying drawings.

DETAILED DESCRIPTION OF EMBODIMENTS

Specific structures and functional details disclosed herein are merely representative, and are intended to describe the objectives of exemplary embodiments of this application. However, this application may be specifically implemented in many alternative forms, and should not be construed as being limited to the embodiments set forth herein.

In the description of this application, it should be understood that orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application. In addition, the terms such as "first" and "second" are used only for the purpose of description, and should not be understood as indicating or implying the relative importance or implicitly specifying the number of the indicated technical features. Therefore, a feature defined by "first" or "second" can explicitly or implicitly includes one or more of said features. In the description of this application, unless otherwise stated, "a plurality of" means two or more than two. In addition, the terms "include", "comprise" and any variant thereof are intended to cover non-exclusive inclusion.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in this application according to specific situations.

The terminology used herein is for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, operations, elements, and/or components, but do not preclude the presence or addition of one or more other features, integers, steps, operations, elements, components, and/or combinations thereof.

This application is described below with reference to the accompanying drawings and embodiments.

Figure 1:
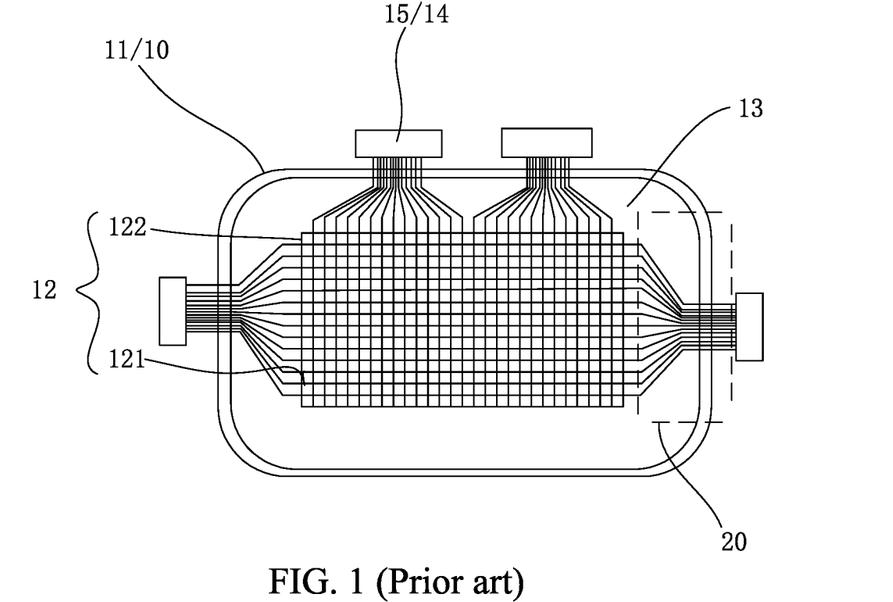
FIG. 1 is a schematic diagram of a display panel.
Figure 2:
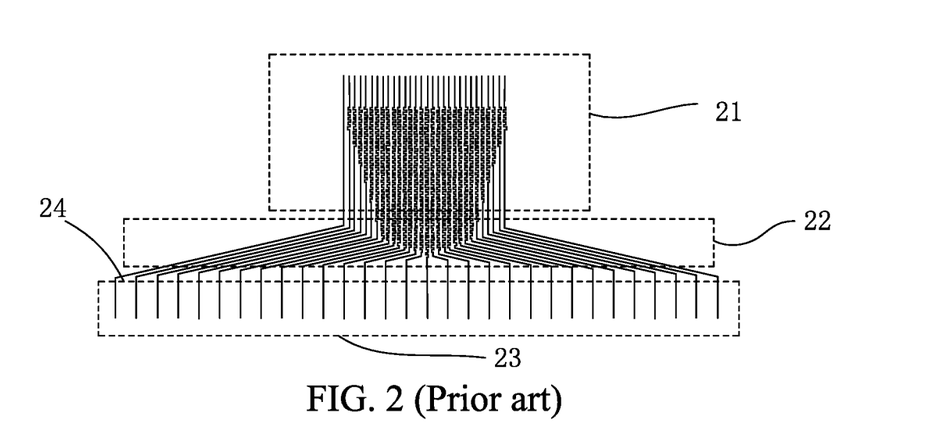
FIG. 2 is a track schematic diagram of a fan-out area.
Figure 3:
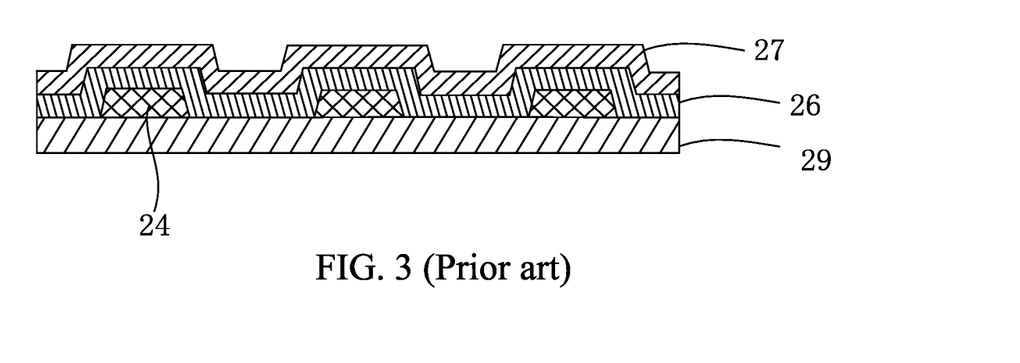
FIG. 3 is a schematic diagram of a section of the fan-out area.
Figure 4:
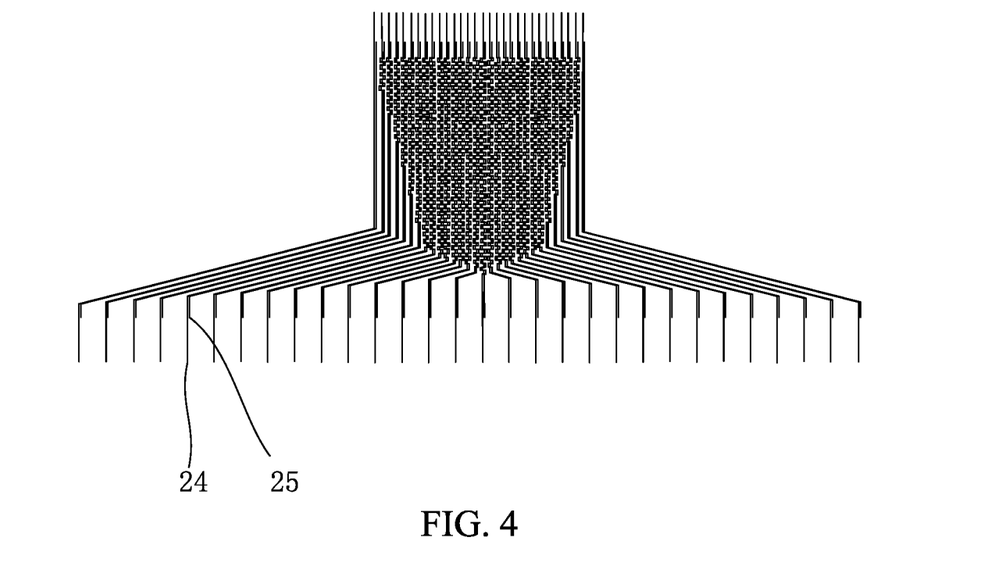
FIG. 4 is a schematic diagram of tracks of a fan-out area according to an embodiment of this application.
Figure 5:
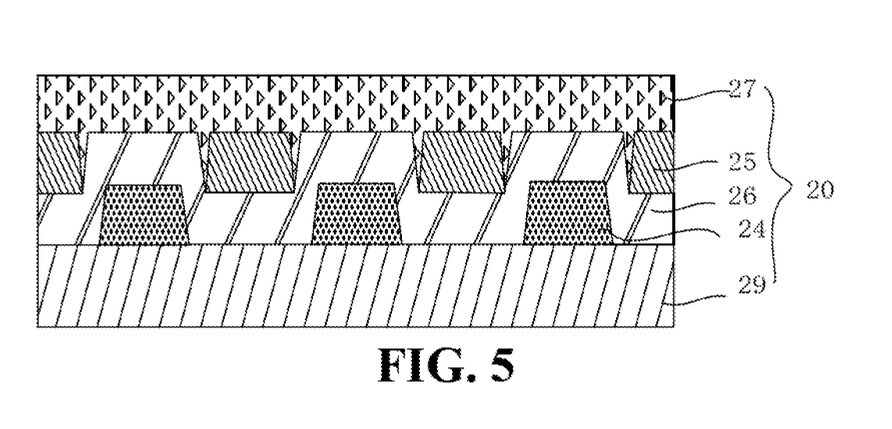
FIG. 5 is a schematic diagram of a section of the fan-out area according to an embodiment of this application.
Figure 6:
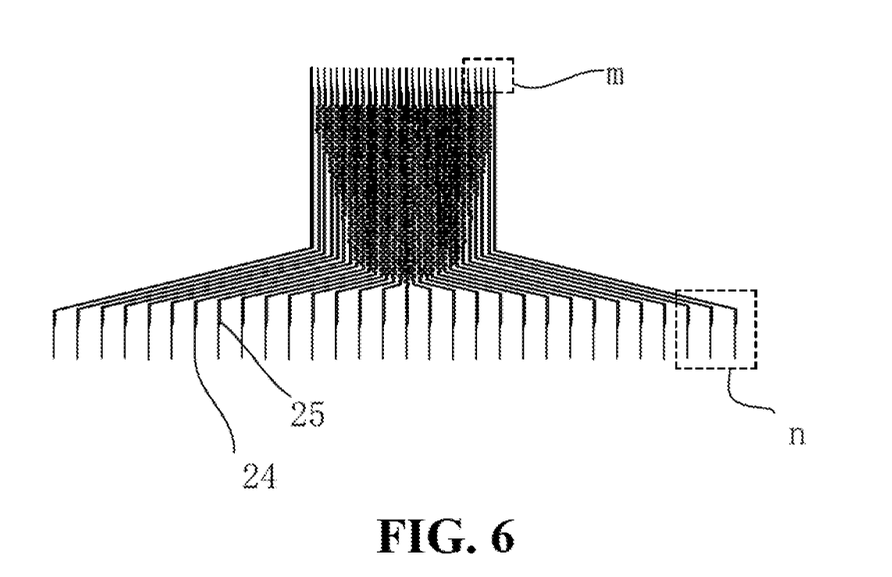
FIG. 6 is a schematic diagram of tracks of another fan-out area according to an embodiment of this application.
Figure 7:
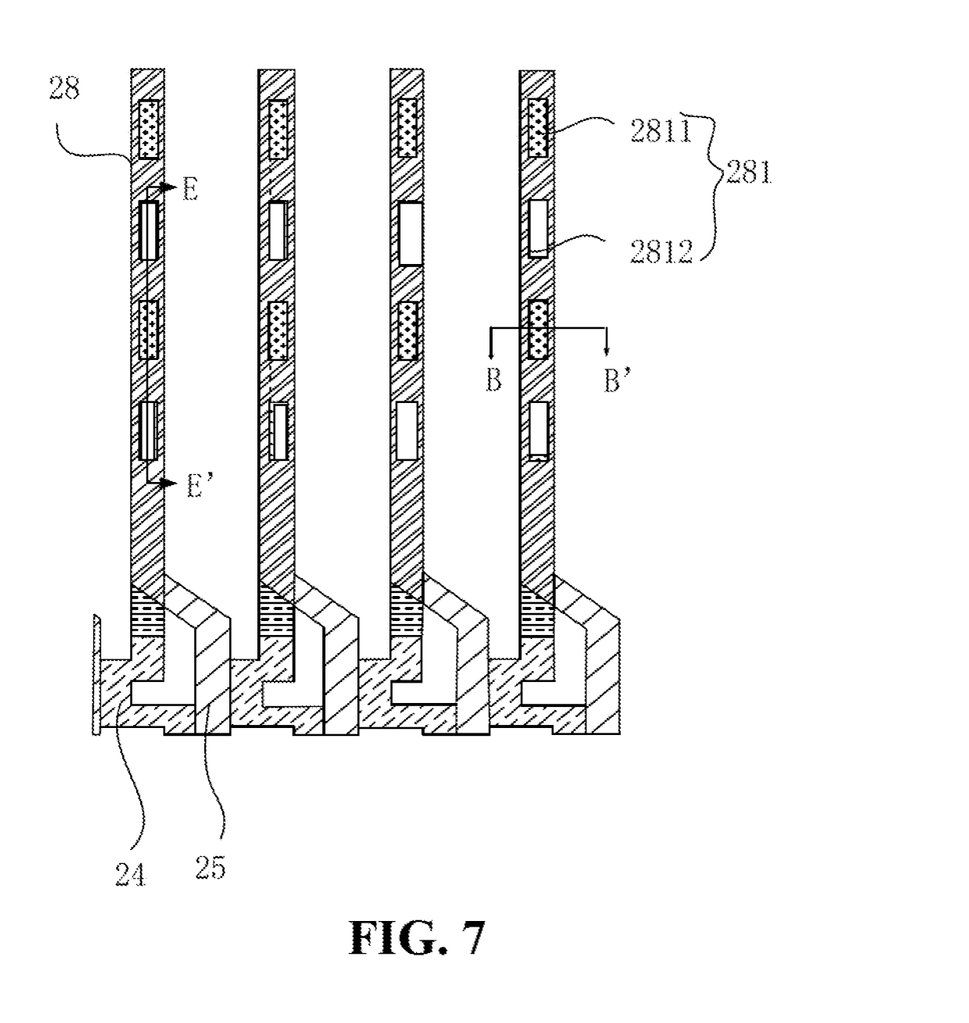
FIG. 7 is a schematic diagram of a part m of tracks of another fan-out area according to an embodiment of this application.
Figure 8:
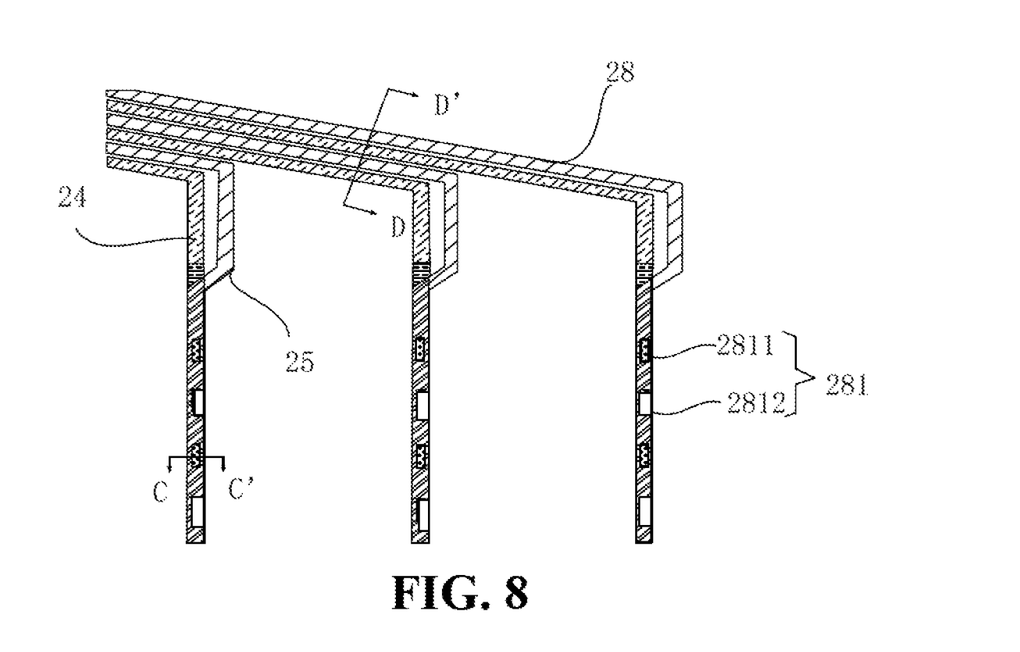
FIG. 8 is a schematic diagram of a part n of tracks of another fan-out area according to an embodiment of this application.
Figure 9:
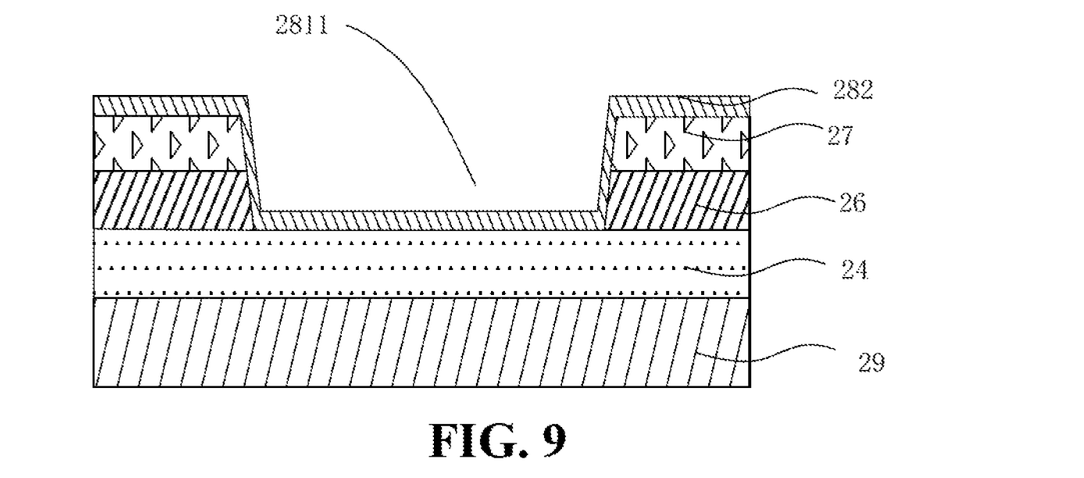
FIG. 9 is a schematic diagram of sections BB' and CC' according to an embodiment of this application.
Figure 10:
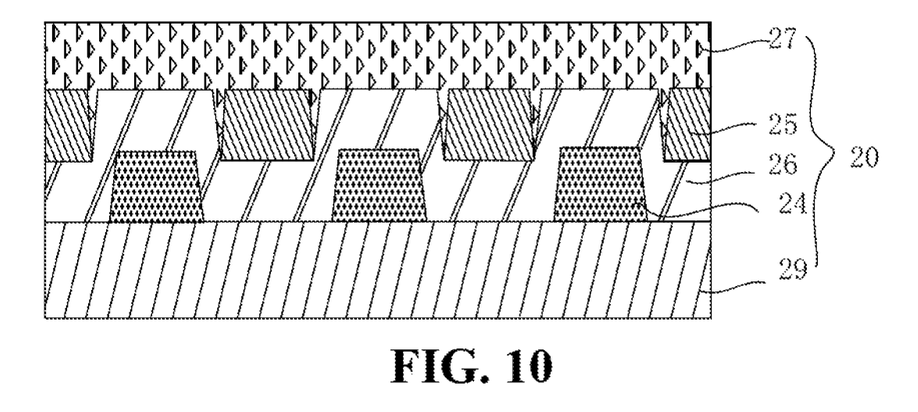
FIG. 10 is a schematic diagram of a section DD' according to an embodiment of this application.
Figure 11:
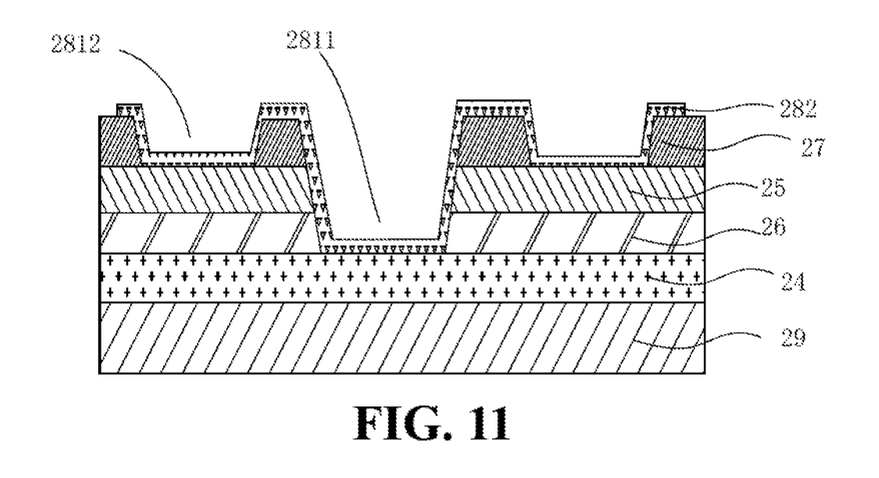
FIG. 11 is a schematic diagram of a section EE' according to an embodiment of this application.

As shown in FIG. 1 to FIG. 3, before TFT-LCD is filled with liquid crystal, an array substrate and a color filter substrate with patterns are generally coated with a layer of alignment layer (PI) to produce an anchoring force for the liquid crystal, so that the liquid crystal has a constant tilt angle. Then the alignment layer is liquid when applied to the substrate, and the alignment film can be formed only after the alignment layer is dried. As being liquid, the alignment liquid may have certain fluidity when dripping onto the substrate, and on the side of the array substrate, the flow of the alignment liquid has a great relationship with the "terrain". As shown in FIG. 2, tracks of a conventional fan-out area 20 are dense near a terminal area of a drive circuit 14, while the tracks near a display area 12 are relatively wide, and the tracks need to be connected in a one-to-one correspondence manner, and the resistance difference is minimal. Therefore, the conventional fan-out area 20 is designed with curved lines in the middle and straight-line tracks on the edges (thus ensuring that the length is similar and the resistance value is minimal in difference). However, when the alignment liquid is applied, since the edge tracks are parallel, regular "grooves" may be formed after the array substrate manufacturing process is completed, as shown in FIG. 3, the alignment liquid is easy to flow to frame glue along these "grooves" after being applied, and is overlapped with the frame glue to affect the curing of the frame glue, thus causing the quality problems.

As shown in FIG. 4 to FIG. 12, embodiments of this application disclose a display panel 11. The display panel 11 includes: a display area 12 including data lines 121 and scanning lines 122, where the data lines 121 and the scanning lines 122 are vertically distributed; a non-display area 13 arranged around the display area 12 and including a plurality of first metal lines 24, where the first metal lines 24 are connected with the data lines 121 or the scanning lines 122, and the plurality of first metal lines 24 are arranged on a same layer; and a drive circuit 14 connected with the data lines 121 or the scanning lines 122 through the first metal lines 24. The non-display area 13 includes a fan-out area 20, the drive circuit 14 includes a plurality of sub-drive circuits 15. The fan-out area 20 is an area formed by all first metal lines 24 connected with each sub-drive circuit 15, and the fan-out area 20 is connected with the display area 12 and the drive circuit 14. The fan-out area 20 includes a plurality of second metal lines 25, and each of the second metal lines 25 is located between two adjacent first metal lines 24. The surface of the fan-out area 20 is flat. In the present scheme, the second metal lines 25 are used for filling up clearances among the tracks of the fan-out area 20, so that the whole fan-out area 20 forms a relatively-flat terrain rather than a terrain with channels, and the alignment liquid can be prevented from flowing along the channels.

In one or more embodiments, two ends of each second metal line 25 are respectively connected with the adjacent first metal lines 24. In the present scheme, the first metal lines 24 and the second metal lines 25 form a parallel circuit. Assuming that the resistance of a single fan-out track based on the first metal line 24 and the second metal line 25 is respectively R1 and R2, the resistance of the single fan-out track after applying this application is R1×R2/(R1+R2). The value of R1 is always greater than the value of R1×R2/(R1+R2), so that the scheme also have an effect of reducing the fan-out track resistance value.

In one or more embodiments, the fan-out area 20 includes an overlapped area 28, and the overlapped area 28 is an area formed by stacking two ends of the second metal lines 25 and the first metal lines 24; the overlapped area 28 includes transfer via holes 281 and a conductive layer 282; and the conductive layer 282 penetrates through the transfer via holes 281 to be respectively connected with the first metal lines 24 and the second metal lines 25. In the present scheme, the transfer via holes 281 are easy to process by stacking the first metal lines 24 and the two ends of the second metal lines 25, and holes can be formed downwardly directly from the surface of the fan-out area 20. Furthermore, a cross sectional area of the tracks in the fan-out area 20 is relatively small, the requirement on the processing precision is relatively high, the way for connecting the first metal lines 24 and the second metal lines 25 through the conductive layer 282 is relatively simple, the first metal lines 24 and the second metal lines 25 do not need to be welded or wound, and the requirement can be met by directly laying a layer of conductive layer 282 on the surface of the overlapped area 28.

In one or more embodiments, the transfer via holes 281 include first transfer via holes 2811 and second transfer via holes 2812, the first transfer via holes 2811 expose the first metal lines 24, the second transfer via holes 2812 expose the second metal lines 25, and the conductive layer 282 penetrates through the first transfer via holes 2811 and the second transfer via holes 2812 to be respectively connected with the first metal lines 24 and the second metal lines 25. Compared with the way that the conductive layer 282 is communicated with the first metal lines 24 and the second metal lines 25 through one transfer via hole 281, in the present scheme, another type of transfer via holes 281 is additionally arranged, so that the contact area between the conductive layer 282 and the second metal lines 25 is larger, and the connection effect between the first metal lines 24 and the second metal lines 25 is better.

In one or more embodiments, one overlapped area 28 includes a plurality of first transfer via holes 2811 and a plurality of second transfer via holes 2812. In the present scheme, by increasing the number of the first transfer via holes 2811 and the second transfer via holes 2822, the exposed area of the first metal lines 24 and the second metal lines 25 in the overlapped area 28 is larger, and the contact area between the conductive layer 282 and the first metal lines 24 as well as the second metal lines 25 is larger, so that the contact area between the first metal lines 24 and the second metal lines 25 is larger, and the conducting effect is better.

In one or more embodiments, the fan-out area 20 includes a first insulating layer 26, a second insulating layer 27 and a substrate 29, where the first metal lines 24 are arranged on the surface of the substrate 29, the first insulating layer 26 is arranged on the surfaces of the first metal lines 24, the second metal lines 25 are arranged on the surface of the first insulating layer 26, and the second insulating layer 27 is arranged on the surfaces of the second metal lines 25. In the present scheme, the first insulating layer 26 is arranged between the first metal lines 24 and the second metal lines 25, so that the occurrence of short circuit between the first metal lines 24 and the second metal lines 25 can be prevented; and the surface of the second metal line 25 is provided with the second insulating layer 27 to prevent the alignment liquid or liquid crystal from corroding the second metal lines 25.

In one or more embodiments, the fan-out area 20 includes a first straight-line area 21, a second straight-line area 23 and an oblique-line area 22, where the oblique-line area 22 is arranged between the first straight-line area 21 and the second straight-line area 23, the first straight-line area 21 is adjacent to the display area 12, and the second straight-line area 23 is adjacent to the drive circuit 14. Joints of the second metal lines 25 and the first metal lines 24 are respectively located in the first straight-line area 21 and the second straight-line area 23. In the present scheme, the first straight-line area 21 and the second straight-line area 23 are located on two end positions of the fan-out area 20, and if the two ends of the second metal lines 25 are connected to the first straight-line area 21 and the second straight-line area 23, the second metal lines 25 are required to fully fill the grooves formed by the first metal lines 24 in the oblique-line area 22, so that the flat area on the surface of the fan-out area 20 is larger, and the effect of blocking the alignment liquid is better.

In one or more embodiments, an included angle formed by the portion of the second metal lines 25 in the overlapped area 28 and the portion of the second metal lines 25 outside the overlapped area 28 is an obtuse angle. In the present scheme, the folding amplitude of the second metal lines 25 is prevented from being excessively large, resulting in shortening of the service life of the second metal lines 25.

In one or more embodiments, the conductive layer 282 is made of indium tin oxide. In the present scheme, the indium tin oxide is also used as a raw material of a transparent electrode layer in the display panel 11; and the conductive layer 282 and the transparent electrode layer are made of the same material, so that when the transparent electrode layer is processed, the conductive layer 282 can be directly processed, thereby saving an additional step, and saving the production time and cost.

Figure 12:
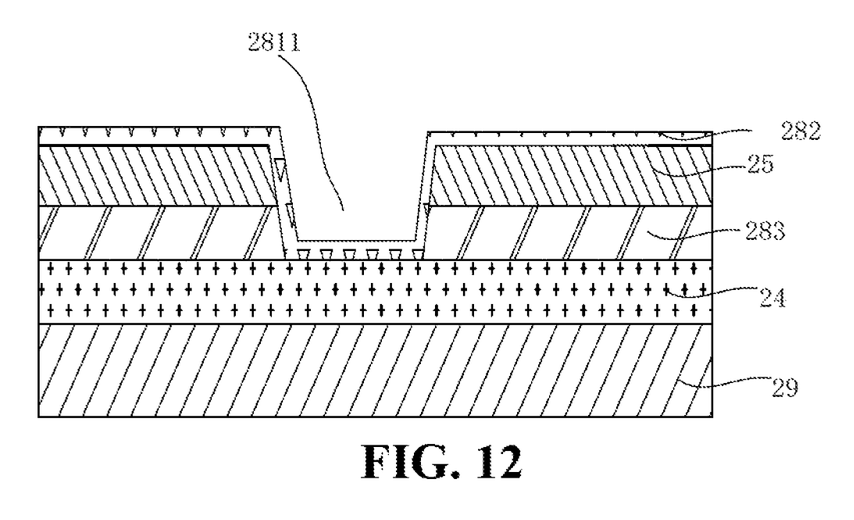
FIG. 12 is a schematic diagram of a section of tracks of another fan-out area according to an embodiment of this application.

As shown in FIG. 12, in one or more embodiments, the overlapped area 28 includes a third insulating layer 283, where the third insulating layer 283 is located on the surfaces of the first metal lines 24, the second metal lines 25 are located on the surface of the third insulating 283, the transfer via holes 281 expose the first metal lines 24, and the conductive layer 282 penetrates through the transfer via holes 281 to be respectively connected with the first metal lines 24 and the second metal lines 25. In the present scheme, below the conductive layer 282 are provided with exposed first metal lines 24 or second metal lines 25, and the third insulating layer 283 is located between the first metal lines 24 and the second metal lines 25 without contacting the conductive layer 282, so that a larger contact of the first metal lines 24 and the second metal lines 25 can be achieved, and the conducting effect is better.

As another embodiment of this application, as shown in FIG. 4 to FIG. 11, a display panel 11 is disclosed. The display panel 11 is divided into a display area 12 and a non-display area 13. The display panel 11 includes a drive circuit 14 including a plurality of sub-drive circuits 15. The non-display area 13 includes a plurality of first metal lines 24, one end of each first metal line 24 is connected with data lines 121 or scanning lines 122 in the display area 12, and the other end is connected with the sub-drive circuits 15. The plurality of first metal lines 24 is arranged on a same layer. The non-display area 13 includes a plurality of fan-out areas 20, and each fan-out area 20 is an area formed by all first metal lines 24 connected with each sub-drive circuit 15.

Each fan-out area 20 includes a plurality of second metal lines 25, a conductive layer 282, first transfer via holes 2811, second transfer via holes 2812, a first insulating layer 26 and a second insulating layer 27. The first insulating layer 26 is arranged on the surfaces of the first metal lines 24; the second metal lines 27 are arranged on the first insulating layer 26, each of the second metal lines 25 is located between two adjacent first metal lines 24, two ends of each second metal line 25 are arranged right above the adjacent first metal lines 24, and the surface of each second metal line 25 is flush with the surface of the first insulating layer 26. The second insulating layer 27 is arranged on the surfaces of the second metal lines 25, the first transfer via holes 2811 expose the first metal lines 24, the second transfer via holes 2812 expose the second metal lines 25, and the conductive layer 282 connects the first metal lines 24 exposed by the first transfer via holes 2811 and the second metal lines 25 exposed by the second transfer via holes 2812.

The second metal lines 25 are used for filling up clearances among tracks of the fan-out areas 20, so that the whole fan-out areas 20 form a relatively flat terrain rather than a terrain with "channels", and the alignment liquid can be prevented from flowing along the channels. Meanwhile, the first metal lines 24 and the second metal lines 25 are connected in parallel, thereby reducing the impedance of the tracks of the fan-out areas 20.

As another embodiment of this application, as shown in FIG. 4 to FIG. 12, a display apparatus 10 is disclosed. The display apparatus 10 includes the display panel 11.

The panel in this application may be a twisted nematic (TN) panel, an in-plane switching (IPS) panel, or a multi-domain vertical alignment (VA) panel, and may certainly be any other suitable type of panel.

The foregoing content describes the present application in detail with reference to the specific implementation manners, and it should not be regarded that the specific implementations of the present application are limited to these descriptions. Persons of ordinary skill in the art can further make simple deductions or replacements without departing from the concept of this application, and such deductions or replacements should all be considered as falling within the protection scope of this application.

What is claimed is:

1. A display panel, comprising:
    a display area, comprising data lines and scanning lines, wherein the data lines are distributed to be perpendicular to the scanning lines;
    a non-display area, arranged around the display area, comprising a plurality of first metal lines, wherein the first metal lines are connected with the data lines or the scanning lines, and the plurality of first metal lines are arranged on a same layer; and
    a drive circuit, connected with the data lines or the scanning lines through the first metal lines;
    wherein the non-display area comprises a plurality of fan-out areas, the drive circuit comprises a plurality of sub-drive circuits, the fan-out areas are areas formed by all first metal lines connected with each sub-drive circuit, and the fan-out areas are connected with the display area and the drive circuit;
    wherein each fan-out area comprises a plurality of second metal lines, and each of the second metal lines is located between two adjacent first metal lines; and the surface of the fan-out area is flat;
    wherein of each fan-out area, two ends of each of the second metal lines are each connected with the respective adjacent first metal line to form a parallel circuit, wherein let a resistance value of each second metal line be R2, a resistance value of the respective first metal line be R1, then a resistance value of the parallel circuit is $R1*R2/(R1+R2)$, and wherein the value of R1 is always greater than $R1*R2/(R1+R2)$ so as to reduce a fan out track resistance value;
    wherein the fan-out area comprises an overlapped area, and the overlapped area is an area formed by stacking each of two ends of each of the second metal lines and the respective adjacent first metal line, wherein each overlapped area is an area where the respective end of the second metal line overlaps the respective adjacent first metal line.

2. The display panel according to claim 1, wherein each overlapped area comprises transfer via holes and a conductive layer; and the conductive layer penetrates through the transfer via holes to be respectively connected with the respective first metal line and the respective second metal line.

3. The display panel according to claim 2, wherein the transfer via holes comprise at least one first transfer via hole and at least one second transfer via hole, the at least one first transfer via hole exposes the respective first metal line, the at least one second transfer via hole exposes the respective second metal line, and the conductive layer penetrates through the at least one first transfer via hole and the at least one second transfer via hole to be respectively connected with the respective first metal line and the respective second metal line.

4. The display panel according to claim 3, wherein both the at least one first transfer via hole and the at least one second transfer via hole are disposed within the respective overlapped area.

5. The display panel according to claim 4, wherein each overlapped area comprises two first transfer via holes and two second transfer via holes that are alternately arranged.

6. The display panel according to claim 2, wherein the overlapped area comprises a third insulating layer, the third insulating layer is located on the surfaces of the first metal lines, the second metal lines are located on the surface of the third insulating layer, the transfer via holes expose the first metal lines, and the conductive layer penetrates through the transfer via holes to be respectively connected with the first metal lines and the second metal lines.

7. The display panel according to claim 2, wherein the conductive layer is made of indium tin oxide.

8. The display panel according to claim 1, wherein the fan-out area further comprises a first insulating layer, a second insulating layer and a substrate, the first metal lines are arranged on a surface of the substrate, the first insulating layer is arranged on surfaces of the first metal lines, the second metal lines are arranged on a surface of the first insulating layer, and the second insulating layer is arranged on surfaces of the second metal lines.

9. The display panel according to claim 8, wherein in each fan-out area, the first insulating layer comprises alternate convex portions overhead the second metal lines and concave portions overhead gaps between the second metal lines, and wherein the first metal lines are arranged in the concave portions and tops of the second metal lines are flush with tops of the convex portions, and wherein vertical protrusions of the second metal lines onto a plane where the second metal lines are disposed don't overlap the second metal lines.

10. The display panel according to claim 1, wherein the fan-out area comprises a first straight-line area, a second straight-line area and an oblique-line area, the oblique-line area is arranged between the first straight-line area and the second straight-line area, the first straight-line area is adjacent to the display area, and the second straight-line area is adjacent to the drive circuit.

11. The display panel according to claim 1, wherein an included angle formed by the portion of the second metal line in the overlapped area and the portion outside the overlapped area is an obtuse angle.

12. The display panel according to claim 1, wherein of all the first metal lines of each fan-out area, each first metal line comprises a first segment oriented vertical or horizontal, a second segment that obliquely deflects outwards from a point of connection with the first segment, and a third segment that again deflects from a point of connection with the second segment to have a same orientation as the first segment.

13. The display panel according to claim 12, wherein of all the first metal lines and the second metal lines of each fan-out area, one end of each second metal line is located at a position on the first segment of the respective adjacent first metal line, and another end of the second metal line is located at a position on the third segment of the respective adjacent first metal line.

14. The display panel according to claim 1, wherein of all the first metal lines and the second metal lines of each fan-out area, a vertical projection of each first metal line doesn't overlap a vertical projection of the respective adjacent second metal line, except for the two ends of the second metal line that are connected with the respective adjacent first metal line.

15. The display panel according to claim 1, wherein the second metal lines are used to fill up clearances among the first metal lines of the respective fan-out area, enabling the entire fan-out area to form a substantially flat terrain rather a terrain with grooves, thus preventing an alignment liquid to flow along the grooves to affect a frame glue area of the display panel.

16. A display panel, the display panel being divided into a display area and a non-display area, the display panel comprising a drive circuit comprising a plurality of sub-drive circuits;
  the non-display area comprises a plurality of first metal lines, one ends of the first metal lines are connected with data lines or scanning lines in the display area, and the other ends are connected with the sub-drive circuits; and the plurality of first metal lines are arranged on a same layer;
  the non-display area comprises a plurality of fan-out areas, and the fan-out areas are areas formed by all first metal lines connected with each sub-drive circuit;
  wherein the fan-out areas comprise a plurality of second metal lines, conductive layers, first transfer vial holes, second transfer via holes, first insulating layers and second insulating layers;
  the first insulating layers are arranged on the surfaces of the first metal lines;
  the second metal lines are arranged on the first insulating layer, each of the second metal lines is located between two adjacent first metal lines, two ends of each of the second metal lines are each arranged right above the adjacent first metal lines, and the surfaces of the second metal lines are flush with the surface of the first insulating layer; and
  the second insulating layer is arranged on the surfaces of the second metal lines, the first transfer via holes expose the first metal lines, the second transfer via holes expose the second metal lines, the conductive layer connects the first metal lines exposed by the first transfer via holes and the second metal lines exposed by the second transfer via holes;

wherein of each fan-out area, two ends of each of the second metal lines are each connected with the respective adjacent first metal line to form a parallel circuit, wherein let a resistance value of each second metal line be R2, a resistance value of the respective first metal line be R1, then a resistance value of the parallel circuit is R1*R2/(R1+R2), and wherein the value of R1 is always greater than R1*R2/(R1+R2) so as to reduce a fan out track resistance value;

wherein the fan-out area comprises an overlapped area, and the overlapped area is an area formed by stacking each of two ends of each of the second metal lines and the respective adjacent first metal line, wherein each overlapped area is an area where the respective end of the second metal line overlaps the respective adjacent first metal line.

17. A display apparatus, the display apparatus comprising a display panel, wherein the display panel comprises:
  a display area, comprising data lines and scanning lines, wherein the data lines and the scanning lines are vertically distributed;
  a non-display area, arranged around the display area, comprising a plurality of first metal lines, wherein the first metal lines are connected with the data lines or the scanning lines, and the plurality of first metal lines are arranged on a same layer; and
  a drive circuit, connected with the data lines or the scanning lines through the first metal lines;
  wherein the non-display area comprises a plurality of fan-out areas, the drive circuit comprises a plurality of sub-drive circuits, the fan-out areas are areas formed by all first metal lines connected with each sub-drive circuit, and the fan-out areas are connected with the display area and the drive circuit;
  wherein each fan-out area comprises a plurality of second metal lines, and each of the second metal lines is located between two adjacent first metal lines; and
  the surface of the fan-out area is flat;
  wherein of each fan-out area, two ends of each of the second metal lines are each connected with the respective adjacent first metal line to form a parallel circuit, wherein let a resistance value of each second metal line be R2, a resistance value of the respective first metal line be R1, then a resistance value of the parallel circuit is R1*R2/(R1+R2), and wherein the value of R1 is always greater than R1*R2/(R1+R2) so as to reduce a fan out track resistance value;
  wherein the fan-out area comprises an overlapped area, and the overlapped area is an area formed by stacking each of two ends of each of the second metal lines and the respective adjacent first metal line, wherein each overlapped area is an area where the respective end of the second metal line overlaps the respective adjacent first metal line.

* * * * *